United States Patent [19]

Cross et al.

[11] 4,032,398
[45] June 28, 1977

[54] NUCLEAR REACTOR FUEL SUB-ASSEMBLIES

[75] Inventors: Andrew Cross, Lymm; Anthony Randle Lunt, Warrington; Joseph Brian Doherty, Cheadle, all of England

[73] Assignee: United Kingdom Atomic Energy Authority, England

[22] Filed: May 3, 1976

[21] Appl. No.: 682,591

[30] Foreign Application Priority Data

May 7, 1975 United Kingdom ............. 19171/75

[52] U.S. Cl. .................................. 176/43; 176/61; 176/78
[51] Int. Cl.² .......................................... G21C 3/00
[58] Field of Search .......................... 176/43, 61, 78

[56] References Cited

UNITED STATES PATENTS

| 3,060,111 | 10/1962 | Sherman et al. | 176/43 |
| 3,486,973 | 12/1969 | Georges et al. | 176/43 |

*Primary Examiner*—Harvey E. Behrend
*Attorney, Agent, or Firm*—Larson, Taylor and Hinds

[57] ABSTRACT

A fuel sub-assembly has an adjustable coolant flow gag. The gag comprises two relatively rotatable co-axial tubes having baffles defining longitudinal flow paths. The flow paths house flow restrictions of different size and there is a valve member movable by one of the tubes for selecting one of the passages for coolant flow.

3 Claims, 6 Drawing Figures

NUCLEAR REACTOR FUEL SUB-ASSEMBLIES

BACKGROUND OF THE INVENTION

This invention relates to nuclear reactors and primarily to fuel sub-assemblies for liquid metal cooled nuclear reactors.

A fuel assembly for a liquid metal cooled nuclear reactor may comprise a multiplicity of closely spaced, parallel fuel pins between which liquid metal coolant can be flowed. To facilitate replacement of fuel pins, in one known construction of liquid metal cooled nuclear reactor, the pins are arranged to form fuel sub-assemblies each comprising a bundle of pins enclosed within a tubular shroud or wrapper and having means for plugging the lower end into a diagrid member. Coolant is flowed upwardly from the diagrid through the wrappers of the sub-assemblies. The fuel sub-assemblies are usually arranged in groups, the pins of some groups being more enriched in fissile isotope than those of other groups and varied flows of coolant are required to optimise the coolant outlet temperature of the sub-assemblies. Whilst varied flows can be effected by gagging the inlet ports of each sub-assembly on assembly of the core, difficulties arise owing to the change in heat flux generated in the sub-assemblies due to varying rates of burn-up and batch replacement of sub-assemblies. Removal of fuel sub-assemblies from the fuel assembly containing vault merely to effect a change of gagging is a complex operation and therefore means is desired whereby variations in gagging can be effected whilst the fuel sub-assemblies are housed within the vault.

SUMMARY OF THE INVENTION

According to the invention, in a nuclear reactor fuel sub-assembly having a bundle of spaced fuel pins enclosed within a tubular wrapped through which liquid coolant can be flowed, there is variable flow restriction means disposed in a region of the fuel sub-assembly which is upstream of the fuel pins with respect to coolant flow, the means comprising a plurality of discrete, axially extending ducts for coolant flow, a series of spaced flow restrictions within the ducts, the restrictors of each duct being arranged to offer a different restriction to fluid flow than the restrictors in the other ducts, and a valve member for directing coolant flow through a selected one of the ducts.

Before insertion in a liquid metal cooled fast reactor fuel assembly the valve member of the sub-assembly may be set to select a duct having restriction to coolant flow appropriate to the intended position to be occupied in the fuel assembly and, subsequently, when the fuel is partly burned up and/or when its position in the assembly is required to be changed, the valve member can be moved to select an alternative duct offering a different restriction to coolant flow.

In a preferred construction, the sub-assembly has a spike for engaging a fuel assembly support diagrid of a reactor and defining an inlet port for coolant flow to the sub-assembly, and the variable flow restriction means comprises relatively rotatable co-axial inner and outer tubular members, the outer member forming an extension of the tubular wrapper and the inner member forming an extension to the spike means, the inner tubular member housing a series of spaced, transverse discs having at least three groups of apertures arranged in sectors, the apertures in each sector being of different size to those in the other sectors, axially extending baffles defining the discrete ducts through series sectors of apertures, a central shaft drivingly connected to the outer tube and carrying an apertured plate constituting the valve member, and indexing means for releasably locking the inner and outer members against relative rotation.

The invention also resides in a nuclear reactor construction having a fuel assembly comprising a plurality of sub-assemblies according to the preceding paragraph, the sub-assemblies being vertically arranged side-by-side with their spikes ends lowermost and engaging a diagrid member and wherein there is provided at least one valve adjusting station having a keying member wherein the lower end of the inner tubular member of a sub-assembly may be engaged whilst the tubular wrapper and the outer tubular member are rotated relative to the inner member.

Description of the Drawings

Constructional embodiments of the invention are described, by way of example, with reference to the accompanying drawings wherein.

DESCRIPTION OF THE PREFERRED EMBODIMENTS

Figure 1:
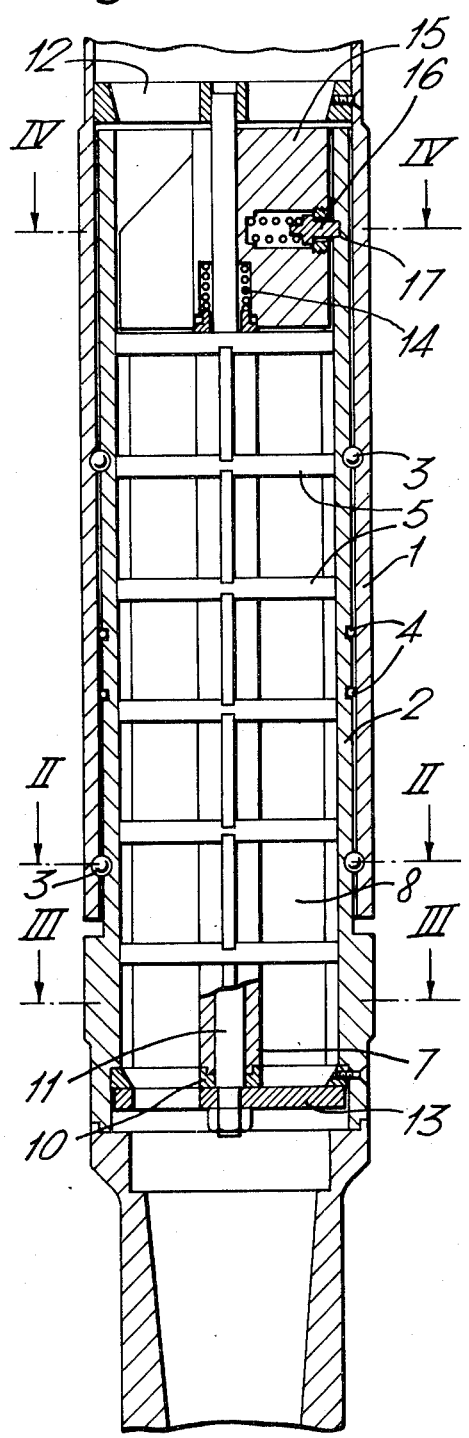
FIG. 1 is a fragmentary side view in section of a fuel sub-assembly.
Figure 2:
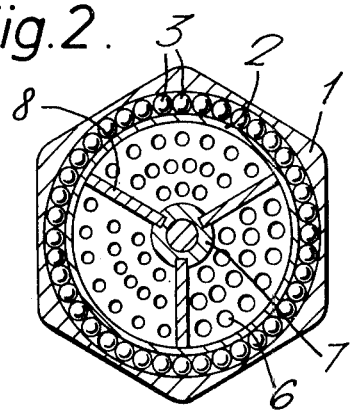
FIG. 2 is a cross-section on line II—II of FIG. 1.
Figure 3:
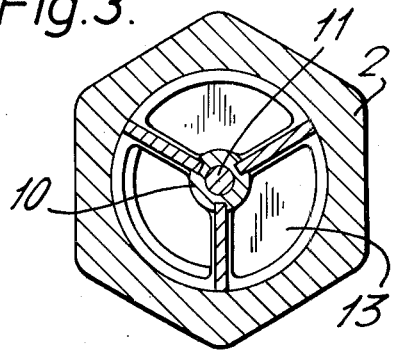
FIG. 3 is a cross-section on line III—III of FIG. 1.
Figure 4:
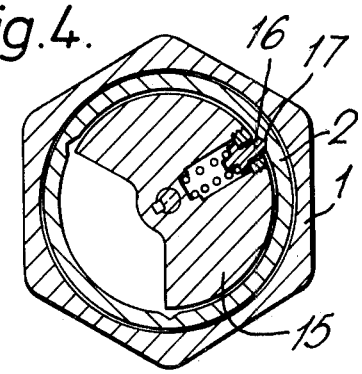
FIG. 4 is a cross-section on line IV—IV of FIG. 1.

In the drawings there are shown relatively rotatable coaxial tubular members 1 and 2. The outer member 1 forms an extension to the fuel pin containing wrapper of a fuel sub-assembly whilst the inner member 2 forms an extension to a spike for engaging a fuel assembly support diagrid member. The tubular members are relatively rotatable on two ball races 3 and are sealed together by rings 4. The inner tubular member 2 houses a series of spaced discs 5 having apertures 6 for fluid flow. The apertures are arranged in three sectors those in each sector being of different diameter to those in the other sectors. The discs are mounted on a central support tube 7 and are separated by spacers 8 each comprising three radially extending fins which are seal welded at their edges to the adjacent discs 5 and to the central support tube 7 thereby to define three discrete axially extending flow ducts each including groups of apertures. An apertured selector valve seating plate 10 is secured to the lower end of the inner tubular member 2. A central shaft 11 carried by a spider 12 secured to the outer tubular member 1 is keyed thereto (not shown in the drawings) to prevent relative rotation between shaft and spider whilst allowing relative longitudinal sliding motion and the lower end of the shaft carries a selector valve member 13. The valve member 13 comprises a plate having an aperture in one 120° sector only and the valve member is urged upwardly into abutment with the seating plate 10 by a helical coil compression spring 14 interposed between the upper end of the support tube 7 and a diffuser block 15 secured to the shaft 11. The diffuser block carries a spring loaded plunger 16 which can engage any one of three indents 17 equally spaced about the inner surface of the inner tube member 2.

Figure 5:
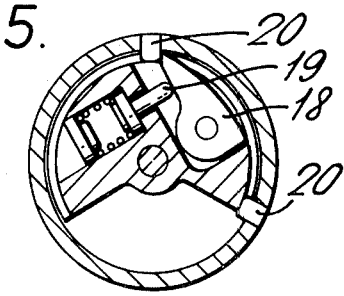
FIG. 5 is a cross-section showing an optional additional feature.

In operation in a liquid metal cooled nuclear reactor, coolant flow is upwardly through the apertured discs thence through the wrapper in heat exchange with the fuel pins. Passage through the apertured discs is restricted to one of the three passages as determined by the position of the aperture in the selector valve member 13. Because the apertures in the discs 5 are of different sizes in adjoining passages, the passages offer different restrictions to fluid flow and prior to insertion in a reactor fuel assembly a passage having a restriction to fluid flow appropriate for the position to be occupied by the fuel sub-assembly is selected by rotating the inner tubular member relative to the outer tubular member. Subsequently, after operation of the reactor when the fuel is partly burned-up and/or when its position in the assembly is required to be changed, the selector valve member 13 can be repositioned, again by rotating the inner tubular member 2 relative to the outer tubular member 1 to increase or decrease the restriction to fluid flow. Precise selection, which after the fuel sub-assembly has been irradiated must be effected by remote operation, is achieved by means of the plunger 16 in co-operation with one of the indents 17. Although not shown in the drawings, the inner and outer tubular members are provided with co-operating stops to limit relative rotation of the members through an angle of 240°, so that, during selection by remote operation, reverse rotation at the low flow setting and forward rotation past the high flow setting is prevented. In order to prevent inadvertent relative rotation of the selector valve member 13 and the seating plate 10 to decrease the coolant flow rate and thereby create a hazardous condition, it is preferable that the fuelling machine be provided with interlocks to ensure rotation in one direction only but such a feature may be incorporated in the fuel sub-assembly as shown in FIG. 5. The diffuser block 15 carries a pawl 18 which is urged radially outwards by a spring loaded plunger 19 into engagement with one of two stops 20. Rotation of the selector valve member 13 relative to the seating plate 10 is thereby ensured unidirectional.

Figure 6:
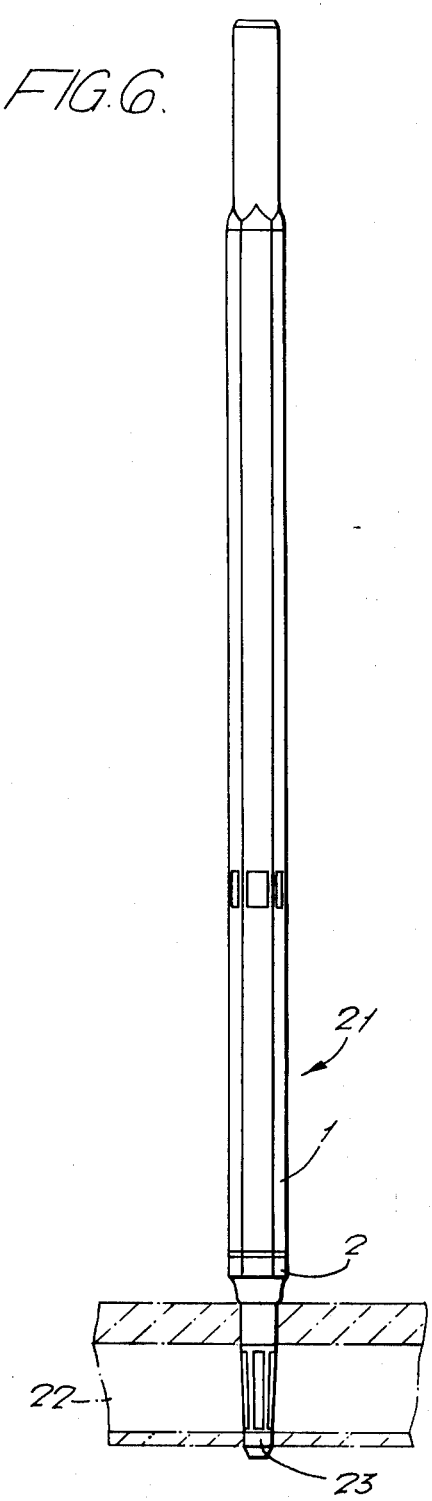
FIG. 6 is an elevation of the fuel sub-assembly.

The reactor fuel assembly comprises a multiplicity of fuel sub-assemblies arranged vertically and side-by-side. The fuel sub-assemblies one of which is shown in FIG. 6 and designated 21 are each plugged into an apertured diagrid member 22 by means of the spike 23 attached to the lower end of the inner tubular member 2 and coolant is flowed from the diagrid member into the spike and upwardly into the wrapper. The fuel sub-assemblies are arranged in inner, intermediate and outer regions having varied fissile isotope content. The sub-assemblies are arranged in groups, those of each group being biassed to lean towards a central support member of the group. At least one of the support members in a group of the outer region is provided with a socket disposed above the core for engaging the lower end of a fuel sub-assembly thereby providing a valve adjusting station in the vault.

In order to change the fluid flow restriction of an irradiated fuel sub-assembly, the sub-assembly is lifted from the diagrid member to above the fuel assembly by the refuelling machine of the reactor construction and is transported to the valve adjusting station, the lower end of the sub-assembly then being engaged in the socket of the central support member. The upper end of the sub-assembly including the wrapper, fuel pins and upper tubular member can thereby be rotated relative to the lower end by manipulation of the refuelling machine and the readjusted sub-assembly returned to the diagrid member without need of withdrawal from the vault.

In an alternative construction of reactor fuel assembly the fuel sub-assemblies are restrained in side-by-side abutment by a circumferential restraint girdle.

The lower end regions of the tubular members 2 and the upper regions of the sub-assembly wrappers are provided with complementary engageable pads so that, in order to vary the coolant flow rate through a selected sub-assembly, the sub-assembly is raised by the fuelling machine to engage in keying manner the pads on its tubular member 2 with the complementary pads on the wrappers of adjacent sub-assemblies and the wrapper of raised sub-assembly is then rotated relative to the tubular member.

The described flow gagging arrangement enables three separate pre-determined flow settings to be obtained substatially without causing cavitation and with an expected accuracy of ± 2%. Changeover from one valve setting to another can be carried out with the minimum of fuel handling operations.

We claim:

1. A nuclear reactor fuel sub-assembly comprising:
   a tubular wrapper for conducting coolant flow,
   a bundle of spaced fuel pins within the tubular wrapper, and
   variable flow restriction means disposed in a region of the sub-assembly which is upstream of the fuel pins with respect to coolant flow, the restriction means comprising means defining a plurality of discrete axially extending ducts for coolant flow, a series of spaced flow restrictors within the ducts, the restrictors of each duct being arranged to offer a different restriction to fluid flow than the restrictors in the other ducts, and a valve member for directing coolant flow through a selected one of the ducts.

2. A fuel sub-assembly according to claim 1 having a spike for engaging a fuel assembly support diagrid of a nuclear reactor, the spike defining an inlet port for coolant flow to the sub-assembly, and wherein the variable flow restriction means comprises:
   relatively rotatable inner and outer tubular members, the outer member forming an extension of the tubular wrapper and the inner member forming an extension of the spike means,
   a series of spaced, transverse discs having at least three groups of apertures arranged in sectors, the apertures in each sector being of different size to those in the other sectors,
   axially extending baffles defining the discrete ducts through series sectors of apertures,
   a central shaft drivingly connected to the outer tube,
   an apertured plate constituting a valve member carried by the central shaft, and
   indexing means releasably locking the inner and outer members against relative rotation.

3. A fuel sub-assembly according to claim 2 wherein there is a spring loaded pawl and stop mechanism arranged to ensure unidirectional rotation of the valve member.

* * * * *